Patented Sept. 30, 1924.

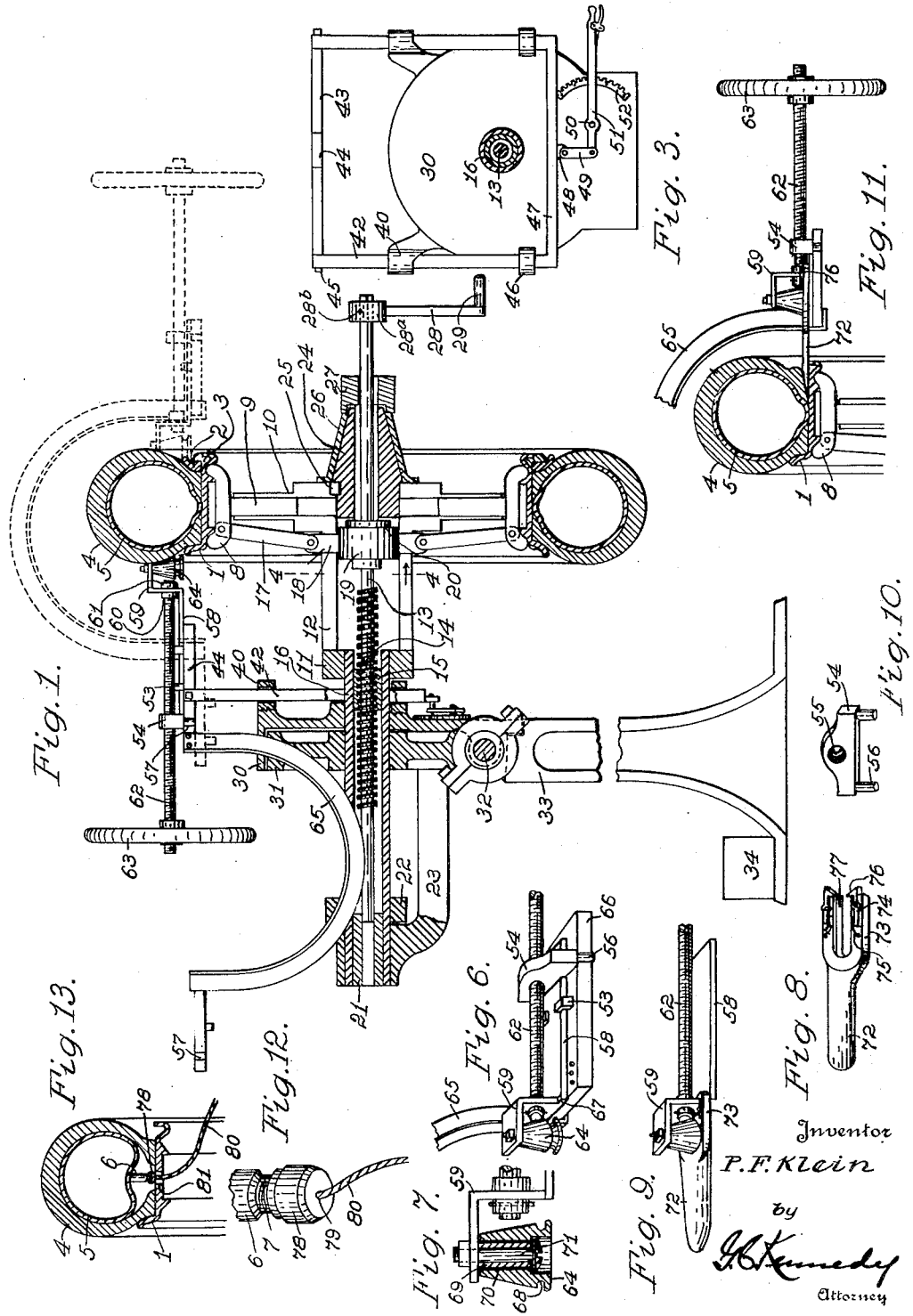

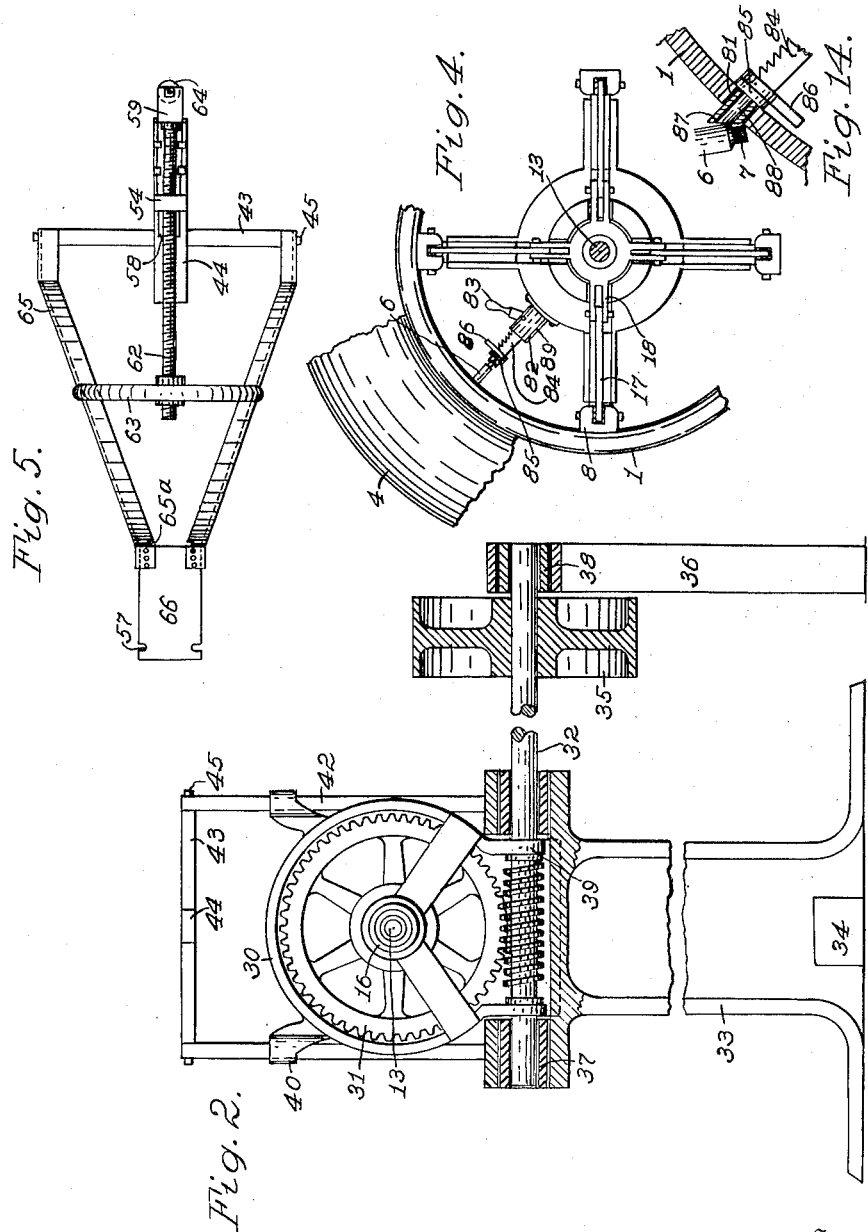

1,509,870

UNITED STATES PATENT OFFICE.

PETER F. KLEIN, OF WATERLOO, IOWA.

APPARATUS FOR MOUNTING AND DEMOUNTING PNEUMATIC TIRES.

Application filed March 9, 1923. Serial No. 623,980.

*To all whom it may concern:*

Be it known that I, PETER F. KLEIN, a citizen of the United States of America, and a resident of Waterloo, Blackhawk County, Iowa, have invented certain new and useful Improvements in Apparatus for Mounting and Demounting Pneumatic Tires, of which the following is a specification.

My invention relates to improvements in apparatus for mounting and demounting pneumatic tires, and the objects of my improvements are, first, to provide mechanism for mounting a pneumatic tire upon a wheel-rim; second, to arrange the tire-manipulating devices of said mechanism to render it operative to remove such tires from the rims, including implements adapted to break up adhesions therebetween; third, to furnish auxiliary means to mount a tire valve-stem in an aperture of the rim in the operation of mounting the tire on the rim, and fourth, to supply means in said apparatus adapted to disengage and entirely separate the valve-stem from the rim prior to removing the tire.

These objects I have attained by the mechanism which is hereinafter described and claimed, and illustrated in the drawings, it being understood that slight modifications in any of the structures of said apparatus are nevertheless within the principles and scope of this invention.

In said drawings, Fig. 1 is a view of the apparatus, partly in side elevation and partly in section with parts removed. Fig. 2 is a view, partly in end elevation and partly in section, showing the worm-gearing of the apparatus. Fig. 3 is a cross section of the device taken immediately forward of the worm-wheel housing. Fig. 4 is a detail rear elevation of the adjustable clamping-means for a wheel-rim taken on a transverse section indicated by the broken line 4—4 in said Fig. 1 in a direction indicated by the arrow. Fig. 5 is a top plan of the swinging implement-holder. Fig. 6 is an enlarged perspective view of the operating devices at one end of said swinging holder. Fig. 7 is an enlarged detail view, partly in side elevation and partly in section of the pressure-roller and its carrier. Fig. 8 is a perspective view of the wedge tool. Fig. 9 is a perspective view of said wedge tool as mounted on said roller-carrier. Fig. 10 is a perspective view of the bridge-member used on said implement-holder. Fig. 11 is a side elevation of the implement-holder including said wedge tool as operatively related to the tire to be separated from a wheel-rim. Fig. 12 is an enlarged perspective of the device employed in the resetting of a tire valve-stem in a rim before and during the mounting of the tire on a rim. Fig. 13 is a cross section of a tire and rim, showing the position of the said resetting device and the valve-stem just before the use of the device in resetting the valve-stem in an aperture of the rim. Fig. 14 is an enlarged detail view of the operating end of the valve-stem displacing device as in its position after its displacement of the valve-stem from the wheel-rim aperture.

My apparatus may be constructed in any desired dimensions for operating upon different sizes and kinds of tires and rims. It is particularly designed to mount close-fitting tires upon wheel-rims, or to remove the same therefrom, and is supplied with powerful and effective implements for separating the tire, especially when the tire has become agglutinated or otherwise in such adhesion to the rim as to be difficult to separate therefrom.

The apparatus may be designed for either hand- or other power, the apparatus illustrated being power-operated.

The numerals 33 and 36 denote spaced pedestals, the pedestal 33 having spaced bearings 37 and the pedestal 36 a bearing 38, said bearings being in horizontal alinement to seat a driving-shaft 32 having thereon a belt-wheel 35. Orificed bearing projections 39 of an open wheel-housing 30 are pivoted on the shaft 32 between said bearings 37 and said housing has a depending lower edge limiting its swing forwardly by engaging the forward part of the pedestal 33. On the shaft 32 between said trunnions is a worm-thread meshed with teeth of a worm-wheel 31 positioned in the housing 30 and fixedly secured upon a horizontal longitudinal rotatable hollow shaft 16.

Referring to said Fig. 1, the shaft 16 traverses a bearing-opening in said housing and has its rear end rotatably mounted in a bearing on the rear ends of arms 23 projected rearwardly from the housing. On the shaft is fixed a stop-sleeve 22 abutting upon said bearing. Forward of said housing 30, the shaft 16 is in effect extended forwardly by an extension-body of larger diameter indicated by the numeral 11, which forward end of the shaft has a plurality of longitudinal open end slots 12, while the forward part has spaced radial slideways 10 to slidably receive the stems 9 of clamping-members 8. Within the hollow of the body 11 a sleeve 19 is loose on the shaft 13, between longitudinally spaced stops 20, the shaft 13 being positioned axially in the hollow of the shaft 16 to project at its front end therefrom, and provided with a thread 14 meshed with an interiorly-threaded nut 15 fixed in the hollow of the shaft 16, the rear end of the shaft 13 being slidable and rotatable in a hollow bearing-sleeve 21 fixed in the rear end of the hollow of the shaft 16. Connecting-bars 17 are pivotally connected to and between the clamping-bodies 8 and radial lugs 18 on the sleeve 19 which lugs project through the slots 12 of the extension-body 11.

On each side of the housing 30 above and below are the orificed brackets 40 and 46 respectively with their orifices in vertical alinement to slidably receive the standards 42 which are at their lower ends united by a cross-bar 47. A short lug 48 depends from the middle of the bar 47. A hand-lever 51 is pivoted medially at 50 to the front of the housing, and has one end linked by a bar 49 to said lug 48. The lever is provided with the usual detent (not shown) and fingerpiece, the detent meshing with teeth of a rack-sector 52 also mounted on the front of the housing 30. By the use of this lever the standards may be lifted or lowered to a desired adjustment.

In Fig. 5 is shown an arcuate device comprising spaced angle-bar arms 65 of semicircular shape positioned to converge at their free ends with said ends secured by rivets to corner parts of a base-plate 66 laterally notched at 57. The opposite more widely spaced ends of the arms 65 are pivoted on pivot-pins 45 to the outer ends of a cross-arm 43 rigidly connected to opposite sides of a base-plate 44 as by spot-welding or other suitable means. The base-plates 66 and 44 are in longitudinal alinement with each other and project outwardly longitudinally oppositely from the arm-parts 65. The plate 66 has a pair of transversely-spaced inwardly hooked lugs 53 on one face, while the plate 44 has two pairs of like lugs 53 on one face. Referring to said Fig. 6, and the same elements shown by dotted lines at the right of the tire 4 in Fig. 1, the numeral 58 denotes a tool-carrier plate removed from the base-plate 44 and made longitudinally slidable to and fro upon the other base-plate 66 within the other pair of hook-lugs 53. One end of this carrier 58 is bent upwardly then over longitudinally at right angles to have its bracketed part 59 ordinarily project beyond the end of the plate 66. This bracket 59 has a bolt-hole leading downwardly through a fixed sleeve-bearing member 69. An upwardly coned anti-friction roller 64 is rotatably mounted at 70 on the sleeve-bearing 69, and is removably secured thereon by a headed screw-bolt 71 passed upwardly through the hollow of the sleeve-bearing and secured by means of a nut above said bracket.

To insure a good locking engagement between the ends of the angle-bars 65 and the base-plate 66 they are secured about the angles of the plate, and the adjacent part 59 at the bottom made narrower than the part 58 to provide shoulders 67 which may ride under the lugs 53, and through notches 65ª in the angle-bars.

The numeral 54 denotes a bridging-member of bearing-body which is mounted transversely across the plate 58, and has a pair of cylindrical depending pins 56 which enter and are engaged with said lateral notches 57. A threaded shaft 62 has one end rotatably mounted in a bearing-opening in the riser bracket 59 and secured by a terminal removable ring with through pin, and by a fixed collar on the opposite face of the bracket. This shaft works in an interiorly-threaded opening in the bridging-member 54, and has removably secured on its opposite end a hand-wheel 63. The roller 64 has an annular groove 68 around its lower end for a purpose to be described.

An auxiliary tool 72 is shown in Figs. 8, 9 and 11, of elongated wedge-shape with top arcuate to conform to the curvate inner face of a tire 4. This tool has an oppositely projecting pair of forks 73 which may be fitted around the roller 64 in the annular groove 68 to project slightly if at all beyond the vertcial part of the bracket 59. To removably secure the forks 73 to said bracket, any suitable fastening-means may be employed. Detents 76 on rock-arms 74 pivoted on the tops of the forks are controlled by small springs 75. When the tool 72 is pushed past said bracket, with its inner flange 77 fitted in the roller groove 68, the detents 76 snap over and lock upon the bracket releasably. As the carrier 58 is removable from the base-plate 66, it may be mounted similarly on the opposite face of the base-plate 44 slidable under two pairs of hooked lugs 53.

A stop-block is placed back of the pedestal 33 to limit the movement of the tilt rearwardly of the housing 30 and support the rear end of the bracket 23.

When the housing 30 and its connections are vertically tilted on the shaft 32 so that the clamping-means 8 are horizontal, a tire may be more conveniently started by hand upon the rim 1, but the tire may be also started by hand when the clamps 8 are vertically positioned. The arcuate body 65 is then adjusted suitably by shifting the standards 42 by the hand-lever above described, and the body 65 then swung over the tire and rim bridgingly. The carrier-plate 58 is slidingly adjusted to bring the roller 64 into contact with the tire above said rim. The driving-shaft 32 is placed in rotation and the worm-gearing then reduces the speed of rotation of the hollow shaft 16 and said clamping-means, rim and tire to a relatively slow speed. The operator may then rotate the hand-wheel 63 in one direction with said shaft 62 to thereby force the roller 64 gradually and progressively against the tire as the tire slowly rotates, which gradually presses the tire upon the rim 1. The operator may then place the flanged ring 2 in position with its flange inserted in the groove 68 of the roller 64. The roller is then actuated by the hand-wheel 63 in pressing the ring 2 upon the rim 1 far enough to give ample clearance to insert the split-ring or locking-ring 3 between it and the outer flange of the rim. The ring 2 is then released, the tire resiliently reacting to hold both rings tightly interlocked together and with the rim. The arcuate body 65 may then be swung back to its full line position as shown in Fig. 1.

In order to remove the locking-rings 2 and 3 from a tire and rim when it is desired to remove the tire 4 from the rim 1, the pressure-device on the arcuate arms 65 are used similarly while the arms are in said dotted line position, the standards having been previously lowered to the position shown in Fig. 1 where the annular groove 68 of the roller 64 may be placed opposite the outer edge of the flanged inner ring 2. Pressure applied by the roller in the above described way pushes inwardly the ring 2 enough to remove it away from the outer ring 3, and the latter being a split-ring is easily removed, the ring 2 then being also removed, the wedge 72 being then used as described below if necessary. The arcuate arms are then swung back to their full line position and adjusted upwardly in height sufficiently to place the body of the roller 64 in the operating position shown bearing and rolling against the tire 4 just above the abutting flange of the rim 1. Continued pressure of the roller while the rim is in slow rotation pushes the tire to the right far enough to insure its easy manual release. This usually is effectual, but when a very large and heavy tire such as those used on trucks is to be removed, or when the tire is in actual adherence to the rim by agglutination or otherwise, an initial process must be employed, in which the wedging-tool 72 is placed on the tool-carrier 58—59, and used as shown in Figs. 9 and 11. The hand-wheel, while the clamping-means is in rotation, presses the wedging point of the tool 72 between the rim and the abutting surface of the tire, forcing the tire substance apart cleanly until the tire has been loosened enough to permit the arms 65 to be swung back to use the roller 64 to push the tire off as above described.

I have shown in Fig. 1 an attachment or device which may be employed when it is desired to manipulate a tire on the rim of a wire-spoke or disk-wheel having an inwardly coned hub 26, the remainder of the wheel not being shown. This consists of a central conical core 24 removably keyed at 25 within the axial hollow of the central body 10, the core being loose on the shaft 13. In the ordinary use of the apparatus as above described, the parts of this attachment are left in the positions shown, a circularly flanged pressure sleeve 27 loose on the shaft 13 being in contact with the hither end of the body 24. The sleeve $28^a$ on the squared extremity of said shaft has a crank 28 with handle 29, and secured on the shaft by a removable pin $28^b$. When said crank has been removed the hub of the wheel may be mounted as shown in position in Fig. 1 at 26, upon the conical core 24, and the crank replaced and rotated to rotate the shaft 13 appropriately to bring the sleeve $28^a$ in engagement compressively with the hub 26 to lock it in position. The arcuate arms and pressure-device may then be swung over, and if necessary arms 65 of larger diameter used to afford clearance. The pressure-device is then used as above described in mounting a tire on the wheel rim, or in demounting it.

To insure easy placing of the valve-stem 6 of the inner tube 5 in the seating orifice 81 of the rim 1, I have supplied an interiorly threaded cap 78 to be screwed upon the threaded tip 7 of the valve-stem, the cap having a central hole 79. A flexible member, preferably of wire cord, or chain, as shown at 80 has one end secured by knot or soldering within the cap to issue through the hole 79. Before slipping the combined tire 4—5 upon the rim, the cord 80 is threaded through the rim hole 81, the valve-stem being in a position shown in Fig. 13 usually terminally engaged with the rim near the hole, so that when the tire is pushed upon the rim, the cord may be pulled to slide the valve-stem certainly and quickly through the hole, and the cap may then be removed.

When it is desired to remove a tire from a rim, in order to first displace the valve-stem 6 inwardly to permit of pressing off the rim, the device shown in Fig. 4 is used.

A small jack 89 is secured upon the supporting body of the clamping-arms 17, having a ratchet-bar 84 operated by a lever 83. As shown in Fig. 14, the ratchet-bar has a cylindrical terminally beveled head 88 surrounded by an annulus 85 having a finger 86 by which the annulus may be rotated on the head 88. The outer end of the annulus has a like bevel to that of the head, so that the annulus when rotated to one position places the bevels opposite to grasp the end of the valve-stem 6, and when rotated oppositely the bevels coincide in the same plane to release the valve-stem. As shown in Fig. 4 the bevels being engaged with opposite sides of the end of the valve-stem, the jack is operated to push the valve-stem through the hole in the rim, then the annulus 81 is rocked oppositely to cause the end of the valve-stem to slide off the coincident bevels to endwise engage a part of the rim surface removed from said hole. When the tire is then pressed from the rim, the valve-stem travels with it out of line with said hole until the tire comes away.

Having described my invention, what I claim as new, and desire to secure by Letters Patent, is:

1. In apparatus for mounting and demounting pneumatic tires, rotatable clamping-means adapted to adjustably removably hold a rim with pneumatic tire thereon, a supporting device pivotally mounted intermediate its ends and a pressure-tool mounted adjustably adjacent to abutting parts of either side face of said rim and tire to operate adjustably on either from either side of the clamping-means while the latter is in rotation.

2. In apparatus for mounting and demounting pneumatic tires, rotatable clamping-means adapted to adjustably removably hold a rim with pneumatic tire thereon, a bridging-device mounted pivotally adjacent said clamping-means, and a pressure-tool interchangeably mounted adjustably adjacent to parts of opposite faces of said rim and tire to operate adjustably thereon from either side thereof angularly to separate the tire and rim while they are in rotation.

3. In apparatus for mounting and demounting pneumatic tires, rotatable and tiltable clamping-means adapted to adjustably removably hold a rim with pneumatic tire thereon, and a pressure-device adapted to be reversibly interchangeably mounted adjacent either of opposite sides of said clamping-means for progressive compressive action against said tire to mount it upon the rim or to demount it therefrom.

4. In apparatus for mounting and demounting pneumatic tires, rotatable and tiltable clamping-means adapted to adjustably hold a rim with pneumatic tire thereon, a pressure-device adapted to be reversibly interchangeably mounted adjacent either of opposite sides of said clamping-means for progressive action against said tire, and means for limiting the scope of tilting movement in one direction of said clamping-means.

5. In apparatus for mounting and demounting pneumatic tires, adjustable rotatable clamping-means for a wheel-rim having a pneumatic tire thereon, adjustable supporting-means, a curvate member swingingly mounted upon said supporting-means for inversion to bridge across said tire angularly, and a pressure-device removably adjustably mounted upon an end of said curvate member and movable against either the rim or tire, said pressure-device being transposable to be mounted for the same action on the tire, on an opposite side of the clamping-means.

6. In apparatus for mounting and demounting pneumatic tires, adjustable rotatable clamping-means for a wheel-rim and tire, adjustable supporting-means, an arched member swingingly mounted upon said supporting means, a pressure-device adapted to be removably and transposably mounted upon either end of said arched member to operate angularly movably against the rim or tire from either side of the clamping-means, and said pressure-device including a rotatable pressure-head to contact with the rim or tire.

7. In apparatus for mounting and demounting pneumatic tires, adjustable rotatable clamping-means for a wheel-rim and tire, adjustable supporting-means, an arched member swingingly mounted upon said supporting-means, a pressure-device mounted movably and transposably upon either end of said arched member to operate upon either side of the rim and tire when the curvate member is swung to one direction or the other relative thereto, and a wedging tool included removably in said pressure-device for wedging insertion between the rim and tire progressively while said clamping-means is in rotation.

8. In apparatus for mounting and demounting pneumatic tires, adjustable rotatable clamping-means for a wheel-rim and tire, adjustable supporting-means, an arched member swingingly mounted upon said supporting-means, a pressure-device mounted movably and transposably upon either end of said arched member, said arched member being adapted to be swung in one position across said rim and tire, said pressure-device including a conical pressure-roller having near its base a circumferential groove, and a wedging-tool removably mounted upon the pressure-device having a bifurcated extremity adapted to seat itself around said circumferential groove to be operated progressively with the pressure-device wedgingly between contacting parts or the rim and tire.

9. In apparatus for mounting and demounting pneumatic tires, supporting-means, a hollow shaft rotatably mounted thereon, a worm-wheel mounted on said shaft, a driving-shaft having a worm-thread thereon in mesh with said worm-wheel, a housing for said worm-wheel tiltably supported on said supporting-means, a nut fixed in said hollow shaft, a shaft positioned axially in said hollow shaft having a thread in mesh with said nut, a sleeve mounted on said last-mentioned shaft, clamping-members radially movable on said hollow shaft, linking-connections between said sleeve and said clamping-members, rigidly-connected standards slidably mounted on said worm-wheel housing, means for releasably securing said standards in adjusted positions, an arcuate body swingingly mounted on said standards and adaptable to be swung bridgingly across a rim or tire and rim mounted on said clamping-members, a tool-carrier adapted to be removably slidingly mounted upon either extremity of said arcuate body to be moved toward and from a rim and tire upon the clamping-members, means for sliding said tool-carrier to and fro, and a tool mounted upon said tool-carrier adjacent the abutting part of either the said rim or tire to act compressively thereon while the clamping-means is in rotation and the tool-carrier is progressively moved forwardly.

Signed at Waterloo, Iowa, this 9th day of February 1923.

PETER F. KLEIN.